United States Patent
Lee et al.

(10) Patent No.: US 7,935,025 B1
(45) Date of Patent: May 3, 2011

(54) METHODS AND SYSTEMS FOR ASSISTED DIRECT START CONTROL

(75) Inventors: Seung-Hoon Lee, Northville, MI (US);
Alex O'Connor Gibson, Ann Arbor, MI (US); Gregory Michael Pietron, Canton, MI (US); Yuji Fujii, Ann Arbor, MI (US); Marvin Paul Kraska, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/713,012

(22) Filed: Feb. 25, 2010

(51) Int. Cl.
*B60W 10/10* (2006.01)

(52) U.S. Cl. .......... 477/115; 477/121; 477/127

(58) Field of Classification Search ........ 477/115, 477/121, 127, 130, 156
See application file for complete search history.

(56) References Cited

U.S. PATENT DOCUMENTS

| | | | | |
|---|---|---|---|---|
| 4,382,484 A | * | 5/1983 | Anderson et al. | 180/165 |
| 4,986,383 A | * | 1/1991 | Evans | 180/165 |
| 6,093,974 A | | 7/2000 | Tabata et al. | |
| 6,170,587 B1 | * | 1/2001 | Bullock | 180/69.6 |
| 6,887,183 B2 | * | 5/2005 | Murasugi | 477/143 |
| 7,150,333 B2 | | 12/2006 | Noda et al. | |

FOREIGN PATENT DOCUMENTS

JP 8014076 1/1999

* cited by examiner

*Primary Examiner* — Ha D. Ho
(74) *Attorney, Agent, or Firm* — Allan J. Lippa; Alleman Hall McCoy Russell & Tuttle LLP

(57) ABSTRACT

Methods and systems are provided for pressurizing a hydraulic circuit comprising a hydraulically actuated transmission component and an accumulator. One example method comprises, during an engine idle-stop, adjusting actuation of the hydraulically actuated transmission component over a duration. The method further comprises, during the duration, isolating the accumulator from the hydraulically actuated transmission component when a pressure in the hydraulic circuit is above a threshold, and coupling the accumulator into the hydraulic circuit when the pressure is below the threshold.

17 Claims, 7 Drawing Sheets

METHODS AND SYSTEMS FOR ASSISTED DIRECT START CONTROL

FIELD

The present application relates to methods and systems for controlling an engine shut-down and a subsequent engine restart.

BACKGROUND AND SUMMARY

Vehicles have been developed to automatically perform an idle-stop when idle-stop conditions are met and automatically restart the engine when restart conditions are met. Such idle-stop systems enable fuel savings, reduction in exhaust emissions, reduction in noise, and the like.

Following an engine idle-stop, pressure may be maintained in the hydraulic line to enable transmission and driveline functionality and to reduce the time needed to restart the engine and engage the transmission clutches. Transmission hydraulic circuits may include an auxiliary transmission pump, such as an electrically-motored auxiliary pump, to pressurize fluid in the hydraulic circuit when the engine is shut-down and the mechanical transmission pump is not at full flow capacity. However, such auxiliary pumps may increase component costs while their operation may reduce fuel savings.

One example of maintaining hydraulic line pressure without using an auxiliary pump is illustrated by Tashiro et al. in JP8014076. Therein, when the engine is shut-down, the transmission is isolated and oil pressure in the transmission is maintained by a check valve and an accumulator. By maintaining hydraulic line pressure, transmission clutches may be engaged before the engine is restarted.

However, the inventors have recognized several potential issues with such an approach. As one example, the accumulator connected to the transmission clutches may reduce the hydraulic stiffness in the isolated transmission hydraulic circuit, for example, during adjustment of a transmission clutch during engine restarting. Consequently, during the clutch operation, the response time of clutch engagement may be substantially reduced. Additionally, the accumulator may cause pressure oscillations in the hydraulic circuit that may further delay clutch engagement at engine restart. As such, this may degrade the quality of an engine restart and vehicle launch operation.

Thus, in one example, some of the above issues may be addressed by a method of pressurizing a hydraulic circuit comprising a hydraulically actuated transmission component and an accumulator. In one embodiment, the method comprises, during an engine idle-stop, adjusting actuation of the hydraulically actuated transmission component over a duration, and during the duration, isolating the accumulator from the hydraulically actuated transmission component when a pressure in the hydraulic circuit is above a threshold, and coupling the accumulator into the hydraulic circuit when the pressure is below the threshold.

In one example, the actuation of a hydraulically actuated transmission component may be adjusted over at least a duration of an engine idle-stop operation. To provide the hydraulic line pressure needed to adjust the actuation of the transmission component during the engine idle-stop, a hydraulic circuit comprising the transmission component and an accumulator may be pressurized. In one example, the hydraulically actuated transmission component may be a transmission forward clutch. During an engine idle-stop, the forward clutch apply hydraulic circuit may be isolated from a transmission pump, for example, by closing a clutch isolation valve. As such, during the idle-stop, as the engine spins down and transmission pump flow capacity drops, hydraulic fluid may be exhausted (for example, to a sump) and hydraulic line pressure in the transmission may also drop. Herein, by isolating the clutch hydraulic circuit from the pump, hydraulic fluid and hydraulic line pressure may be held in the isolated clutch hydraulic circuit to facilitate clutch modulation.

During the engine idle-stop, while the forward clutch actuation is adjusted, an engine controller may be configured to isolate the accumulator from the transmission component when a pressure in the hydraulic circuit is above a threshold. In one example, the accumulator may be coupled via an accumulator isolation valve and isolating the accumulator may include closing the accumulator isolation valve. By isolating the accumulator, hydraulic stiffness may be maintained in the isolated hydraulic circuit. The engine controller may be further configured to compensate for pressure drops in the isolated clutch hydraulic circuit, for example due to leakages through clutch seals, circuit valves, and/or circuit solenoids, by selectively coupling the accumulator into the hydraulic circuit when the pressure drops below the threshold. The coupling may include, for example, opening the accumulator isolation valve. By coupling the accumulator, pressurized fluid may be delivered from the accumulator to the forward clutch to swiftly restore hydraulic pressure in the isolated circuit.

In one example, the forward clutch hydraulic circuit may remain isolated until a subsequent engine restart is completed and the transmission pump has resumed full flow capacity. Following engine restart, the forward clutch may be coupled to the transmission pump, for example by opening the clutch isolation valve, so that the pump may provide the forward clutch inlet pressure needed for clutch modulation. Additionally, the accumulator may be recharged, if needed, by opening the accumulator isolation valve and coupling the accumulator into the clutch hydraulic circuit.

In this way, hydraulic pressure may be maintained in a transmission clutch hydraulic circuit during an engine idle-stop, and/or until an engine restart is completed, without operating an auxiliary pump. Additionally, by alternately coupling and decoupling an accumulator to (and from) the transmission component, responsive to a pressure in the isolated clutch hydraulic circuit, hydraulic stiffness may be maintained in the circuit. By maintaining hydraulic line pressure in the isolated clutch hydraulic circuit, a transmission component inlet pressure, (e.g. forward clutch inlet pressure) may be modulated to enable clutch modulation over at least a duration of the engine idle-stop. For example, by adjusting the forward clutch inlet pressure, the forward clutch may be kept fully or partially engaged during the engine stop and/or until a subsequent engine restart is completed. Alternatively, the forward clutch may be kept fully disengaged with intermittent stroking. By maintaining the clutches in an engagement-ready state, and by enabling rapid response times, the transmission may be put in gear swiftly when an engine restart and/or vehicle re-launch is requested. Further, by maintaining hydraulic stiffness in the hydraulic circuit when the engine is shut-down, the response time for clutch engagement during the restart may be reduced and oscillations may be substantially averted. In this way, the quality of engine restarts may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
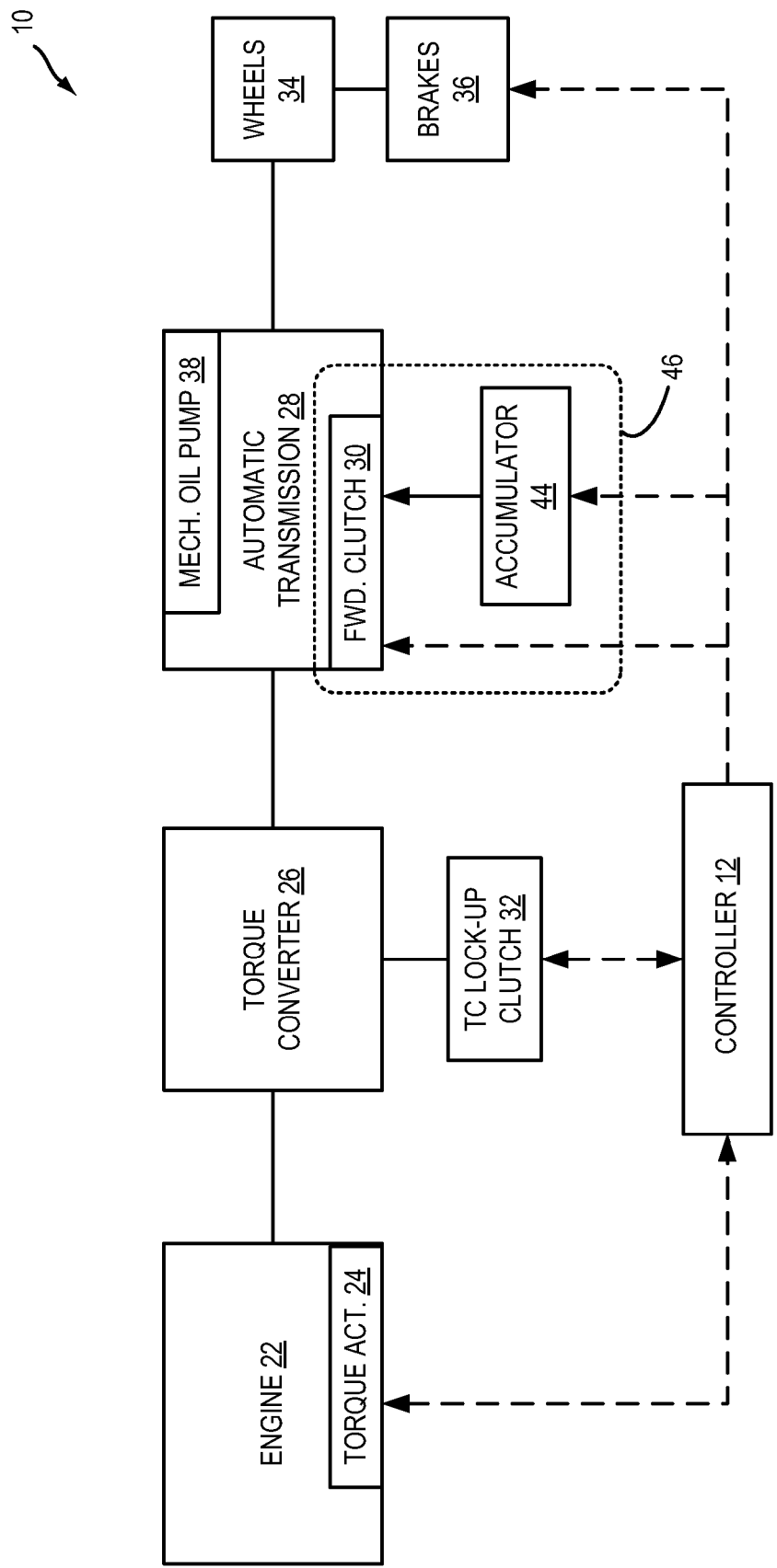
FIG. 1 shows an example vehicle system layout, including details of a vehicle drive-train.
Figure 2:
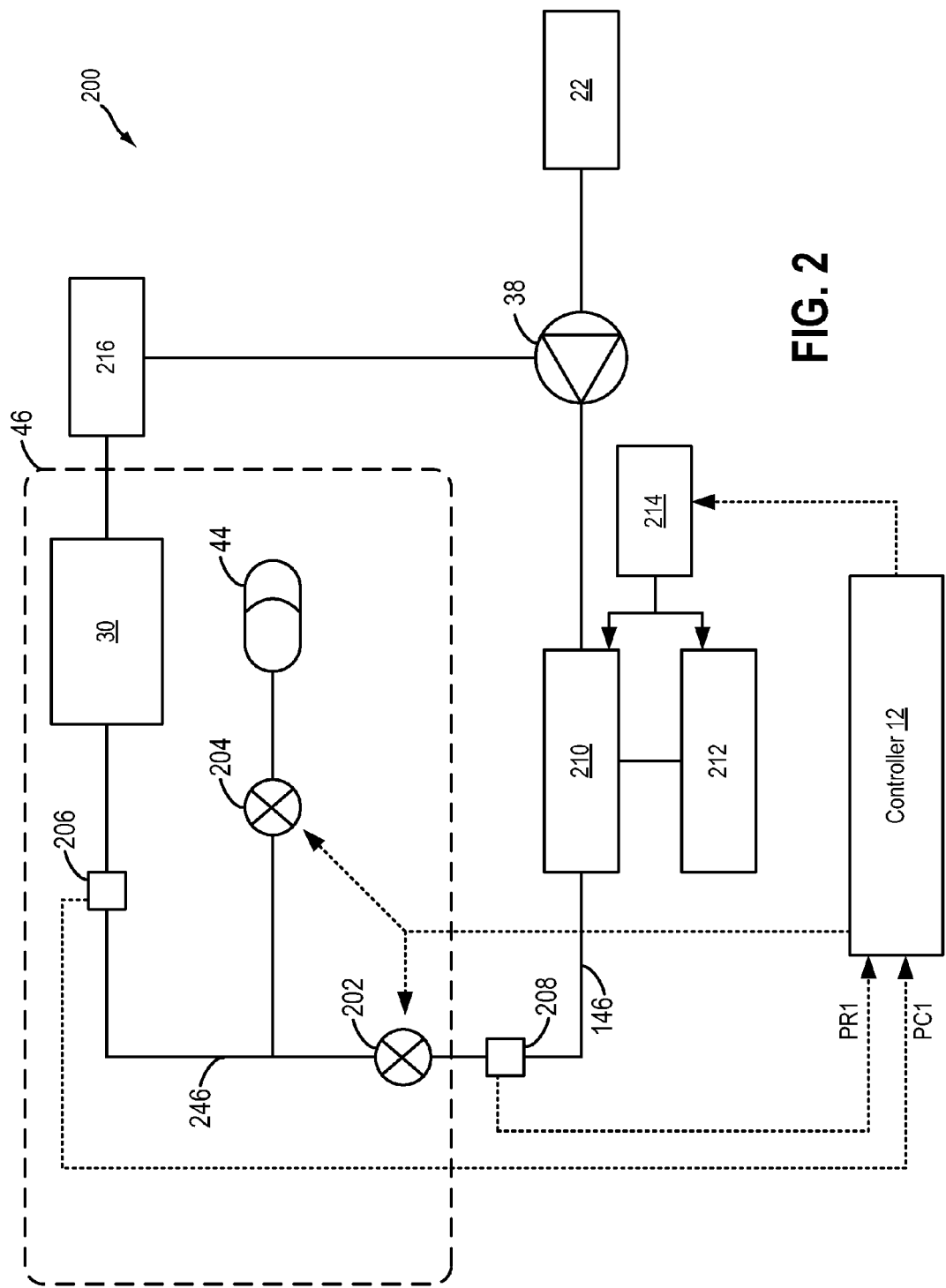
FIGS. 2-3 show example embodiments of the hydraulic circuit of FIG. 1.
Figure 3:
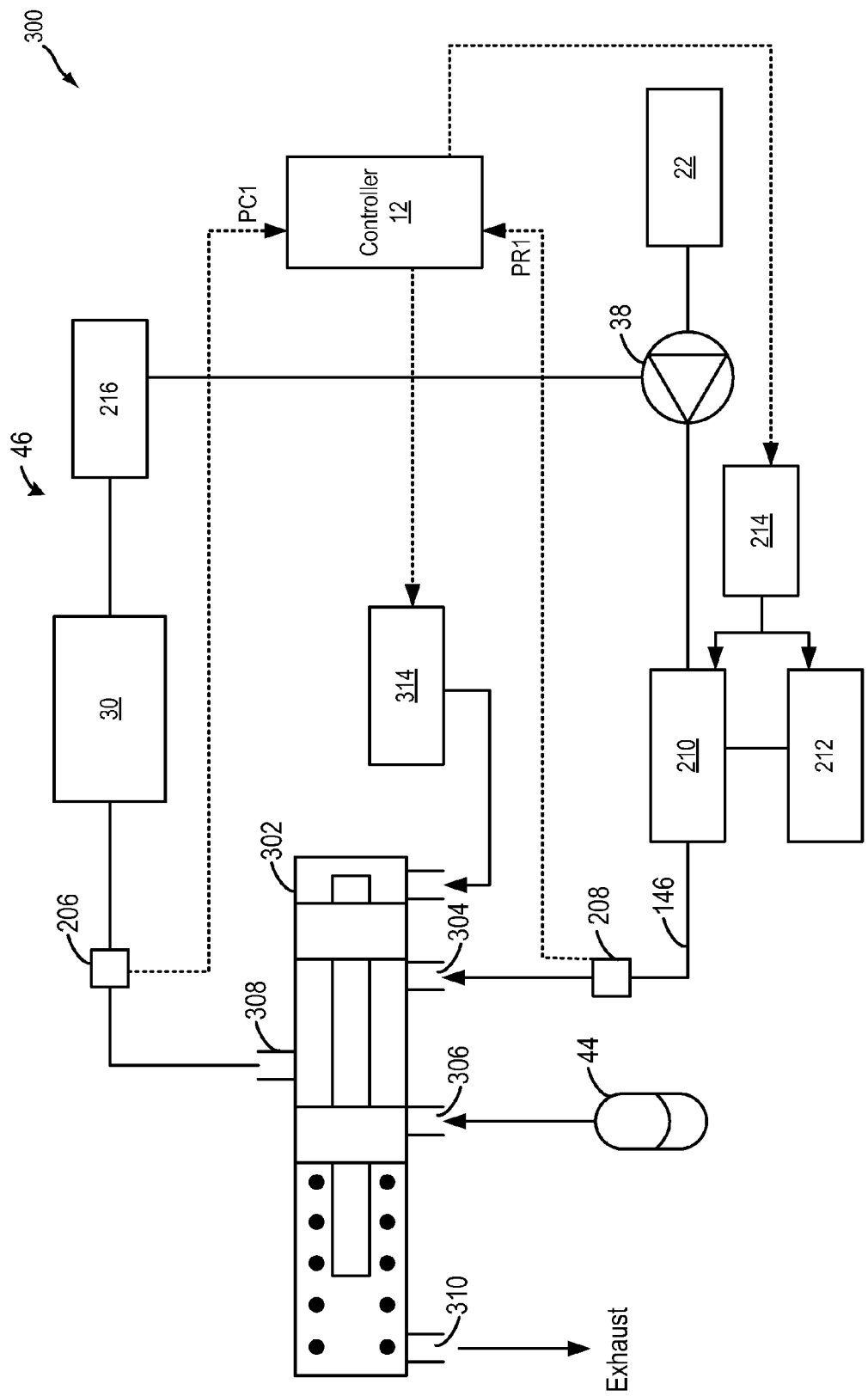
Figure 4:
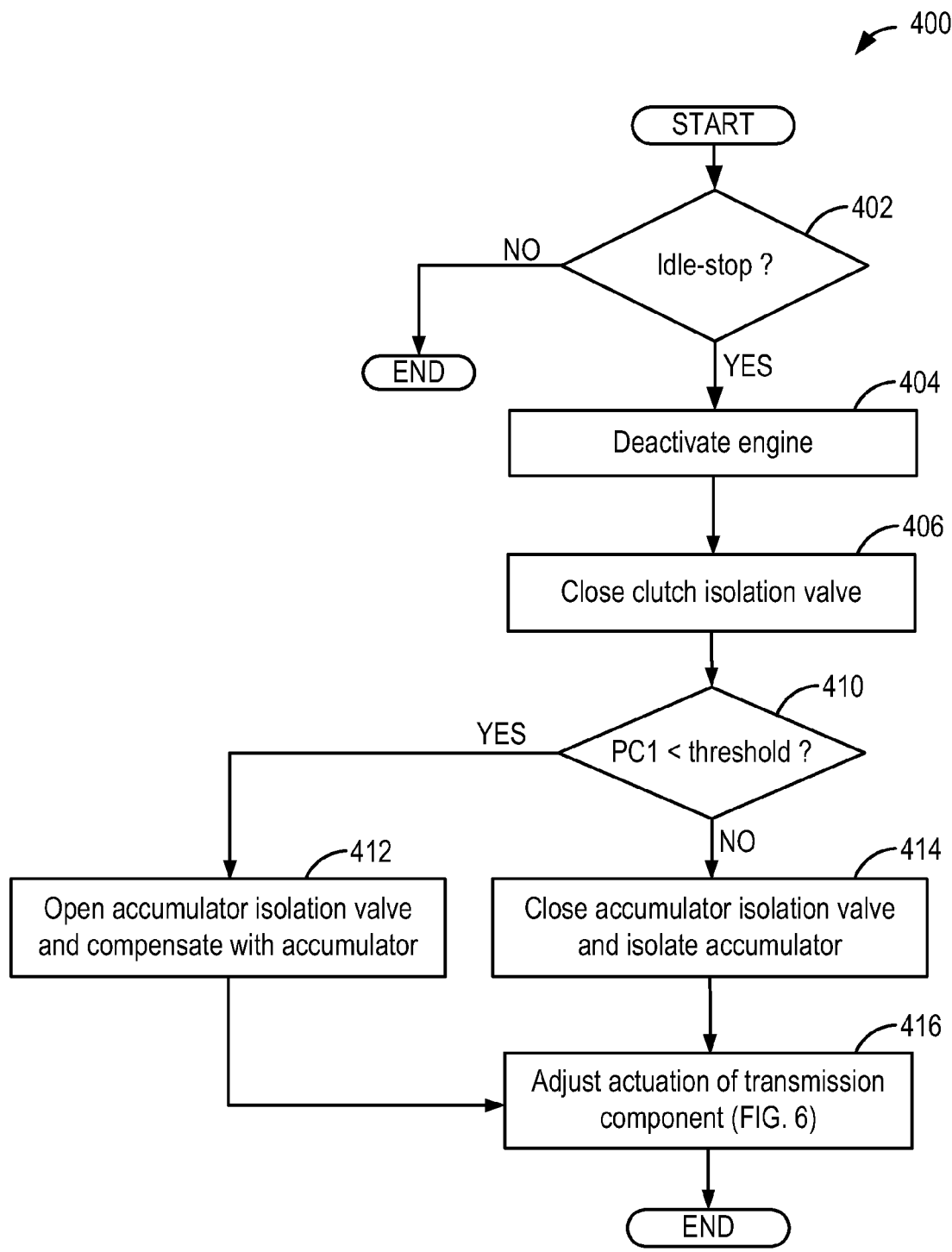
FIG. 4 shows a high level flow chart for maintaining hydraulic line pressure during an engine idle-stop and before an engine restart, according to the present disclosure.
Figure 5:
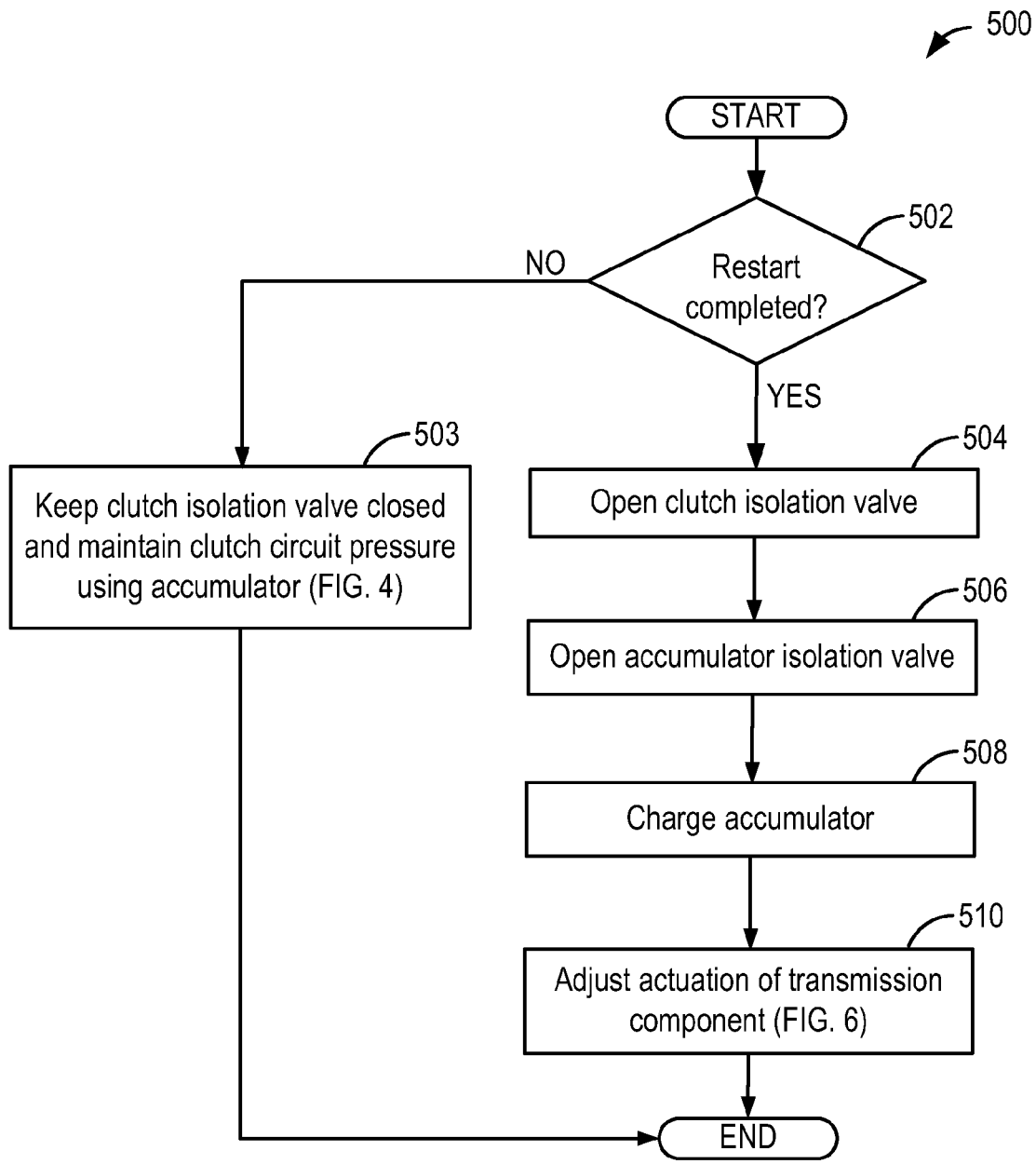
FIG. 5 shows a high level flow chart for recharging the accumulator of FIG. 1 during an engine restart.

The following description relates to systems and methods for maintaining hydraulic line pressure in a transmission clutch hydraulic circuit during an engine idle-stop, without operating an auxiliary pump. As shown in FIGS. 1-3, a transmission clutch hydraulic circuit, including a hydraulically actuated transmission component and an accumulator may be coupled to a transmission mechanical pump. During conditions when the flow capacity of the pump is limited, such as during an engine idle-stop and prior to completion of an engine restart, the transmission component may be isolated from the pump to hold hydraulic fluid, and hydraulic pressure, in the isolated clutch hydraulic circuit. Additionally, in the event of a drop in hydraulic pressure in the circuit, the accumulator may be coupled to the transmission component to restore clutch line pressure. One or more pressure sensors may be included in the hydraulic circuit to facilitate the pressure feedback-based control. With hydraulic line pressure maintained, the actuation of the transmission component may be adjusted over a duration of the idle-stop. During an engine idle-stop and/or prior to engine restart, an engine controller may be configured to perform control routines, such as shown in FIG. 4, to temporarily open an accumulator isolation valve, responsive to clutch circuit pressure, to couple the accumulator to the transmission component and deliver pressurized fluid. When coupled to the hydraulic circuit, the accumulator may facilitate maintenance of line pressure by compensating for pressure fluctuations. When isolated from the hydraulic circuit, the accumulator may facilitate maintenance of hydraulic stiffness and improve clutch engagement response times. After a subsequent engine restart has been completed, and the transmission pump has resumed full flow capacity, the engine controller may perform control routines, such as shown in FIG. 5, to recharge the accumulator, if needed. In this way, as further elaborated in FIGS. 6-7, by maintaining hydraulic line pressure in one or more transmission clutches during engine idle-stop conditions, when the transmission pump is inoperative, clutch modulation may be enabled and clutch engagement, responsive to an engine restart and/or vehicle re-launch request, may be expedited.

FIG. 1 is a block diagram of a vehicle drive-train 10. Drive-train 10 may be powered by engine 22. In one example, engine 22 may be a gasoline engine. In alternate embodiments, other engine configurations may be employed, for example a diesel engine. Engine 22 may be started with an engine starting system (not shown). Further, engine 22 may generate torque via torque actuator 24, such as a fuel injector, throttle, etc. Engine 22 may also include an auxiliary starter system (not shown) to support engine restart at near zero engine speed, for example at 50 RPM. In one example, engine 22 may be selectively and automatically deactivated during idle-stop conditions and automatically restarted during restart conditions.

An engine output torque may be transmitted to torque converter 26 to drive an automatic transmission 28 by engaging one or more hydraulically actuated transmission components, or clutches, including one or more forward clutch(es) 30. As such, a plurality of such hydraulically actuated transmission components or clutches may be engaged, as needed. In one example, the transmission may be a multiple fixed ratio transmission. The output of the torque converter may, in turn, be controlled by torque converter lock-up clutch 32. As such, when torque converter lock-up clutch 32 is fully disengaged, no torque may be transmitted from torque converter 26 to automatic transmission 28. In contrast, when torque converter lock-up clutch 32 is fully engaged, the entire engine output torque may be relayed to an input shaft (not shown) of transmission 28. Alternatively, the torque converter lock-up clutch 32 may be partially engaged, thereby enabling the amount of torque relayed to the transmission to be adjusted.

Torque output from the automatic transmission 28 may in turn be relayed to wheels 34 to propel the vehicle. Specifically, automatic transmission 28 may adjust an input driving force along the input shaft (not shown) responsive to a vehicle traveling condition before transmitting an output driving force to the wheels. As such, wheels 34 may be locked by engaging wheel brakes 36. In one example, wheel brakes 36 may be engaged in response to the operator pressing his foot on a brake pedal (not shown). In the same way, wheels 34 may be unlocked by disengaging wheel brakes 36 in response to the operator releasing his foot from the brake pedal.

A mechanical transmission pump 38 may be connected to the automatic transmission to provide hydraulic pressure to engage forward clutch 30. Transmission pump 38 may be operated in accordance with torque converter 26, and may be driven by engine 22. Consequently, the flow capacity of transmission pump 38 may be limited during an engine shutdown event.

Clutch hydraulic circuit 46 may include the hydraulically actuated transmission component, herein forward clutch 30, coupled to accumulator 44. As further elaborated with reference to FIGS. 2-3, a variety of valves may be included in clutch hydraulic circuit 46 to couple accumulator 44 into clutch hydraulic circuit 46, and to couple forward clutch 30 to transmission pump 38. Additionally, a variety of sensors, such as various pressure sensors, may be included in clutch hydraulic circuit 46. By adjusting the valves, for example, based on pressure input from the pressure sensors, an engine controller may coordinate the coupling of accumulator 44 to forward clutch 30, and forward clutch 30 to transmission pump 38.

During an engine idle-stop, controller 12 may adjust the valves to isolate the clutch hydraulic circuit from the transmission pump so that hydraulic fluid and pressure may be retained in isolated clutch hydraulic circuit 46 while hydraulic fluid and pressure is drained from pump 38. The hydraulic pressure retained in the isolated clutch hydraulic circuit may be used by engine controller 12 to adjust a forward clutch inlet pressure, and thereby adjust an actuation of the clutch over at least a duration of the engine idle-stop. Additionally, while the forward clutch is isolated, controller 12 may couple the accumulator to the forward clutch, as needed, responsive to a pressure in the isolated hydraulic clutch circuit. For example, in response to a drop in clutch hydraulic circuit pressure below a threshold, the accumulator may be temporarily coupled to the forward clutch and pressurized transmission fluid may be delivered from the accumulator to the clutch. Upon restoration of pressure, the accumulator may be isolated from the clutch, enabling hydraulic stiffness to be maintained in the hydraulic circuit. During the subsequent engine restart, when the operation of the transmission pump is resumed, the forward clutch may be coupled to the transmission pump to provide the desired hydraulic pressure. Additionally, the accumulator may be coupled to the hydraulic circuit so that it may be recharged.

In this way, hydraulic pressure may be maintained in a transmission component during engine shutdown without operating an auxiliary transmission pump. In one example, the auxiliary pump may be replaced by the lower cost valves, solenoids, and accumulator components. However, in alternate embodiments, the auxiliary pump may be retained, if desired. By enabling clutch modulation during the idle-stop, and a rapid re-engagement of transmission clutches when a vehicle restart and/or launch is subsequently requested, engine torque may be rapidly transmitted to the wheels at restart.

Controller 12 may also be configured to receive inputs from engine 22 and accordingly control a torque output of the engine. As one example, a torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

FIGS. 2-3 show example embodiments of the clutch hydraulic circuit 46 of FIG. 1. It will be appreciated that components introduced in FIG. 2 may be similarly numbered in FIG. 3, and may not be reintroduced.

FIG. 2 shows a first example embodiment 200 of clutch hydraulic circuit 46. As previously elaborated, clutch hydraulic circuit 46 may include accumulator 44 and a hydraulically actuated transmission component, herein depicted as forward clutch 30. Accumulator 44 may be coupled to forward clutch 30 through accumulator isolation valve 204. Forward clutch 30 may be coupled to transmission pump 38 through clutch isolation valve 202. Transmission pump 38 may pump transmission fluid from oil sump 216 and deliver pressurized transmission fluid into clutch hydraulic circuit 46 and forward clutch 30. The hydraulic pressure in clutch hydraulic circuit may be used to adjust a forward clutch inlet pressure and thereby an actuation of forward clutch 30.

During engine operation, transmission pump 38 may be operated in concert with engine 22 and may have full flow capacity. Accordingly, transmission pump 38 may deliver pressurized hydraulic fluid to clutch hydraulic circuit 46 along transmission hydraulic line 146 and through clutch isolation valve 202. Clutch isolation valve 202 may be, for example, a control valve, a solenoid valve (e.g., on/off solenoid valve), or a check valve (e.g., double ball check valve), etc.

To adjust an actuation of forward clutch 30, controller 12 may adjust clutch regulatory valve 210 and clutch latching valve 212 to provide a corresponding forward clutch inlet pressure. Specifically, controller 12 may adjust the operation of clutch valve solenoid 214 to thereby adjust a volume and pressure of hydraulic fluid delivered to forward clutch 30 through clutch regulatory valve 210, clutch latching valve 212, and transmission hydraulic line 146. Clutch valve solenoid 214 may be, for example, a variable force solenoid or a variable bleed solenoid. To engage forward clutch 30 (e.g., fully engage or partially engage), controller 12 may adjust clutch valve solenoid 214 (e.g. activate or deactivate the solenoid based on solenoid configuration) to open clutch latching valve 212 and clutch regulatory valve 210. By adjusting the current applied across clutch valve solenoid 214, the opening of valves 210 and 214 may be adjusted, thereby adjusting an amount of pressurized transmission fluid delivered from transmission pump 38 into transmission hydraulic line 146. The pressurized transmission fluid may then be delivered to forward clutch 30 and hydraulic clutch circuit 46 through clutch isolation valve 202.

In one example, the opening of clutch isolation valve 202 may be pressure dependent. For example, clutch isolation valve may be opened by controller 12 in response to a pressure PR1 in transmission hydraulic line 146, being larger than a pressure PC1 in clutch hydraulic circuit 46, by a threshold amount. The pressure PR1 in transmission hydraulic line 146 may be estimated, for example, by a first pressure sensor 208 coupled downstream of clutch regulatory valve 210. Similarly, hydraulic circuit 46 may include a second pressure sensor 206, coupled upstream of forward clutch 30, and configured to estimate a pressure PC1 in clutch hydraulic circuit 46. Second pressure sensor 206 may additionally, or optionally, estimate a forward clutch inlet pressure. In one embodiment, first pressure sensor 208 may be coupled to a pressure-sensitive switch (not shown) configured to automatically open clutch isolation valve 202 when pressure PR1 exceeds pressure PC1 by the threshold amount of pressure. In one example, the threshold amount of pressure may be a predefined threshold. In another example, the threshold amount may be a calibratable threshold that is recalibrated intermittently (e.g., at every idle-stop, at every engine restart, at every key-on, etc.).

Thus, in one example, an increase in hydraulic pressure in transmission hydraulic line 146 may trigger the opening of clutch isolation valve 202 and an amount of pressurized transmission fluid may be delivered into clutch hydraulic circuit 46 to adjust the forward clutch inlet pressure and enable forward clutch modulation. While the depicted example illustrates a pressure feedback based control of clutch isolation valve, additionally, or optionally, controller 12 may be configured to coordinate the opening of clutch isolation valve 202 with the operation of clutch valve solenoid 214. In this way, when transmission pump 38 is operating and there is sufficient hydraulic pressure in transmission hydraulic line 146, the clutch hydraulic circuit 46 may be coupled to the pump, and forward clutch 30 may be modulated (as further elaborated in FIG. 6).

In comparison, during an engine idle-stop, following engine deactivation, the flow capacity of transmission pump 38 may become restricted. Hydraulic fluid may be exhausted from transmission hydraulic line 146 and pump 38, for example, into sump 216. If coupled, hydraulic fluid and pressure may also be exhausted from clutch hydraulic circuit 46. Herein, to maintain hydraulic pressure in clutch hydraulic circuit 46 and an inlet pressure in forward clutch 30 when the engine is shut-down, clutch hydraulic circuit 46 may be isolated from transmission pump 38 and transmission hydraulic line 146 by closing clutch isolation valve 202. In one example, controller 12 may coordinate the closing of clutch isolation valve 202 with an engine idle-stop signal. Additionally, the closing of clutch isolation valve 202 may be pressure dependent. Thus, clutch isolation valve 202 may be closed in response to pressure PR1 in transmission hydraulic line 146 being lower than pressure PC1 in clutch hydraulic circuit 46 by a threshold amount. For example, first pressure sensor 208 may be coupled to a pressure-sensitive switch (not shown) configured to automatically close clutch isolation valve 202 when PC1 is greater than PR1 by the threshold amount of pressure. In one example, the same pressure threshold amount may be used to adjust the opening and closing of clutch isolation valve 202. However, in alternate embodiments, the pressure threshold used to control the opening of clutch isolation valve 202 may be different from the pressure threshold used to control the closing of the valve. In this way, when transmission pump 38 is not fully operational and there is insufficient hydraulic pressure in transmission hydraulic line 146, the clutch hydraulic circuit 46 may be isolated from transmission pump 38, while hydraulic fluid and line pressure is held in the hydraulic clutch circuit 46. As further elaborated in FIG. 6, with hydraulic pressure maintained in clutch hydraulic circuit 46, a transmission component may be maintained in gear by maintaining a corresponding transmission clutch applied during at least a duration of the engine idle-stop.

During the duration of clutch actuation adjustment, while hydraulic clutch circuit 46 is isolated from transmission pump 38, accumulator 44 may be used to compensate for pressure fluctuations in the clutch hydraulic circuit. In one example, pressure drops may arise due to leakage of transmission fluid from the clutch hydraulic circuit through clutch seals, various valves and/or solenoids. When the pressure PC1 in the clutch hydraulic circuit 46, as estimated by second pressure sensor 206, is below a threshold, accumulator isolation valve 204 may be opened and accumulator 44 may be coupled into clutch hydraulic circuit 46. Pressurized fluid may then be delivered from accumulator 44 into clutch hydraulic circuit 46 and forward clutch 30. Then, when the threshold pressure has been restored, accumulator isolation valve 204 may be closed and accumulator 44 may be isolated from clutch hydraulic circuit 46. In one example, second pressure sensor 206 may be coupled to a pressure-sensitive switch (not shown) configured to automatically open accumulator isolation valve 204 when PC1 is below the threshold, and automatically close accumulator isolation valve 204 when PC1 is above the threshold. In another example, accumulator isolation valve 204 may be a PWM solenoid valve coupled to engine controller 12, and operated using a pressure-based feedback loop (open or closed loop) in response to a clutch hydraulic circuit pressure, or forward clutch inlet pressure, estimated by second pressure sensor 206. In alternate examples, accumulator isolation valve 204 may be, for example, a variable force solenoid valve, a variable bleed solenoid valve, an on/off solenoid valve, etc.

In yet another example, when forward clutch is kept fully disengaged during the engine idle-stop, the pressure in the hydraulic circuit may be intermittently adjusted to allow the disengaged forward clutch to be intermittently stroked. Herein, accumulator 44 may be intermittently coupled to clutch hydraulic circuit 46 to facilitate the intermittent stroking of forward clutch 30. In this way, accumulator 44 may be coupled into the clutch hydraulic circuit only as needed. By coupling the accumulator into the clutch hydraulic circuit during clutch non-shift events, leakage in the hydraulic circuit may be compensated for and hydraulic pressure in the circuit may be maintained. By isolating the accumulator from the clutch hydraulic circuit during clutch shift events at engine shut-down, the hydraulic stiffness of the circuit may be maintained, improving clutch response times.

In one example, clutch hydraulic circuit 46 may be isolated from transmission pump 38 during the engine idle-stop and until a subsequent engine restart is completed. During the subsequent engine restart, controller 12 may coordinate the opening of clutch isolation valve 202 with the completion of engine restart and the restoration of pump capacity and hydraulic pressure in transmission hydraulic line 146. Additionally, the controller may coordinate the opening of accumulator isolation valve 204 with the engine restart signal to recharge the accumulator.

Pressure sensors 206, 208 may experience a slow drift. Thus, in one embodiment, to improve the pressure-responsive clutch control, the pressure sensor initial for each of first pressure sensor 208 and second pressure sensor 206 may be reset at key-on. As such, the key-on pressure value may be atmospheric pressure. That is, after a vehicle shut-down, the pressure readings of both pressure sensors may bleed down, and the pressure sensors may read an atmospheric pressure. The threshold pressure settings for each pressure sensor coupled switch may be recalibrated based on the reset initial pressure of the corresponding pressure sensor.

FIG. 3 shows an alternate embodiment 300 of clutch hydraulic circuit 46. Herein, clutch isolation valve 202 and accumulator isolation valve 204 may be replaced by a single spool valve 302. Spool valve 302 may be controlled by spool solenoid 314. In one example, spool solenoid 314 may be a variable force solenoid. Herein, spool valve 302 may be configured to combine the control of flows from accumulator 44 and transmission hydraulic line 146 into forward clutch 30. Controller 12 may adjust the activation of spool solenoid 314 responsive to an indication of engine idle-stop or restart and/or responsive to pressure differences in the hydraulic circuits. By adjusting spool solenoid 314, a flow of pressurized hydraulic fluid from either accumulator 44 or transmission pump 38 into forward clutch 30 may be adjusted, thereby modulating the forward clutch inlet pressure and the actuation of forward clutch 30.

In one example, when engine 22 is running and pump 38 is operating, the hydraulic pressure in transmission hydraulic line 146 may be greater than the pressure in the accumulator. Under these conditions, controller 12 may adjust spool valve 302 by operating spool solenoid 314 so that first spool inlet channel 304, communicating with transmission hydraulic line 146, is opened. Herein, pressurized transmission fluid may be delivered from transmission pump 38 into clutch hydraulic circuit 46 through spool outlet channel 308. Additionally, second spool inlet channel 306 (communicating with accumulator 44) may be opened so that the accumulator may be recharged. To adjust the actuation of forward clutch 30, controller 12 may then adjust the pressure applied on forward clutch 30, in clutch hydraulic circuit 46, through adjustments to clutch latching valve 212 and clutch regulatory valve 210. As previously elaborated, by adjusting clutch valve solenoid 214, controller 12 may adjust an amount of hydraulic fluid directed towards forward clutch 30, thereby adjusting the engagement state of the clutch. Excess transmission fluid, corresponding to an excess pressure than required for the desired engagement state of forward clutch 30, and recharging of accumulator 44, may be exhausted, for example to sump 216, through spool exhaust channel 310.

In another example, during an engine idle-stop, when engine 22 is not running and pump 38 is not operating and there is not sufficient hydraulic pressure in transmission hydraulic line 146, controller 12 may adjust spool solenoid 302 so that first spool inlet channel 304 (communicating with transmission hydraulic line 146) is closed and second spool inlet channel 306 (communicating with accumulator 44) is kept open. Herein, pressurized transmission fluid may be delivered from accumulator 44 into clutch hydraulic circuit 46 and forward clutch 30 through spool outlet channel 308 responsive to a pressure difference between accumulator 44 and clutch hydraulic circuit 46, while transmission pump 38 remains isolated. To adjust the actuation of forward clutch 30, controller 12 may then adjust the inlet pressure of forward clutch 30 through adjustments to clutch valve solenoid 214, and corresponding adjustments to clutch latching valve 212 and clutch regulatory valve 210.

It will be appreciated that while the depicted embodiments (in FIGS. 2-3) illustrate the various isolation valves as solenoid valves, in alternate embodiments, each of the isolation valves may be a check valve (e.g., ball check valve), a control valve, various kinds of solenoid valves, or other appropriate valve. In one example, the type of valve used may be selected based on a desired or expected clutch performance. For example, the valve design may be adjusted based on whether, during an engine idle-stop, the transmission clutch is to be kept (in general) fully engaged, partially engaged, or fully disengaged with intermittent stroking.

Now turning to FIG. 4, an example routine 400 is shown for maintaining hydraulic line pressure during an engine idle-stop. At 402, an idle-stop may be confirmed. Idle-stop conditions may include, for example, the engine operating (e.g., carrying out combustion), the battery state of charge being above a threshold (e.g., more than 30%), vehicle speed being below a threshold, no request for air conditioning being made, engine temperature being above a threshold, emission control device temperature being above a threshold (e.g., above a light-off temperature), driver requested torque being below a threshold, vehicle electrical load being below a threshold, brake pedals being applied, accelerator pedal being released, etc. If idle-stop conditions are not confirmed, the routine may end.

If any or all of the idle-stop conditions are met, at 404 an engine controller may initiate an idle-stop operation by deactivating the engine. This may include turning off spark and fuel to the engine cylinders. At 406, in response to the idle-stop indication, a clutch isolation valve may be closed to isolate a hydraulically actuated transmission component (e.g., a transmission forward clutch) and the corresponding clutch hydraulic circuit from the transmission pump. In one example, the clutch isolation valve may be a solenoid valve. Herein, the controller may appropriately activate or deactivate the solenoid (based on the solenoid configuration) to open the clutch isolation valve.

While the depicted example illustrates automatically opening the clutch isolation valve in response to an indication of engine idle-stop, in an alternate embodiment, the opening of the clutch isolation valve may be pressure dependent. Herein, the clutch isolation valve may be opened in response to a transmission hydraulic line pressure PR1 (as estimated by a first pressure sensor coupled downstream of the transmission pump) being greater than a clutch hydraulic circuit pressure PC1 (as estimated by a second pressure sensor coupled upstream of the forward clutch) by a threshold amount. Alternatively, the second pressure sensor may estimate a forward clutch inlet pressure. As such, during the engine idle-stop, as the engine spins down and the transmission pump operation comes to a stop, hydraulic fluid may be exhausted from the transmission hydraulic line. Correspondingly, the transmission hydraulic line pressure PR1 may also gradually fall, for example, below the forward clutch inlet pressure. The first pressure sensor may be coupled to a pressure-sensitive switch that may be configured to close the clutch isolation valve when the difference between PR1 and PC1 is greater than a threshold. In this scenario, clutch isolation valve closure may be slightly delayed relative to the indication of engine idle-stop.

At 410, the pressure PC1 in the isolated clutch hydraulic circuit may be estimated by a pressure sensor coupled upstream of the forward clutch, and it may be determined if the estimated pressure is below a threshold pressure. In one example, the threshold pressure may correspond to a minimum line pressure required in the isolated clutch hydraulic circuit to enable forward clutch modulation. In another example, the threshold pressure may correspond to a minimum line pressure required in the isolated clutch hydraulic circuit to maintain a minimum forward inlet pressure. If the pressure in the hydraulic circuit is below the threshold, then at 412, an accumulator may be coupled to the forward clutch along the clutch hydraulic circuit. Specifically, an accumulator isolation valve may be opened to compensate for the pressure drop in the isolated clutch circuit. If the pressure has not fallen below the threshold, then at 414, the accumulator may be maintained isolated from the clutch hydraulic circuit and the forward clutch. Specifically, the accumulator isolation valve may be closed to maintain hydraulic stiffness in the isolated clutch circuit.

By coupling the accumulator into the isolated hydraulic circuit responsive to a pressure in the hydraulic circuit, hydraulic pressure may be maintained in the circuit. At 416, the hydraulic line pressure of the hydraulic circuit may be used to adjust an engagement state of the isolated forward clutch. For example, the hydraulic line pressure may be used to engage (e.g. fully engage or partially engage) the transmission component. In this way, a transmission component may be maintained in gear by maintaining a transmission clutch applied during an engine idle-stop.

Now turning to FIG. 5, an example routine 500 is described for performing an engine restart from idle-stop. At 502, it may be determined whether an engine restart has been completed. This may include confirming that the engine speed is above a threshold, pump flow capacity is above a threshold, and/or hydraulic pressure in the transmission hydraulic line is above a threshold.

If an engine restart is not completed, then at 503, the clutch isolation valve may be maintained closed and the forward clutch may be kept isolated from the transmission pump. Additionally, the pressure in the isolated clutch hydraulic circuit may be maintained using the accumulator isolation valve. As previously elaborated in FIG. 4, the accumulator isolation valve may be opened, as needed, to compensate for pressure drops in the isolated clutch circuit.

If an engine restart is completed, at 504, in response to the engine restart indication, the clutch isolation valve may be opened to couple the forward clutch and the clutch hydraulic circuit to the transmission pump. By coupling the forward clutch to the transmission pump during conditions when the pump flow capacity is restored, the forward clutch inlet pressure and/or clutch hydraulic circuit pressure may be provided by the pump. Additionally, at 506, the accumulator isolation valve may be opened in response to the engine restart indication to couple the accumulator to the transmission component (herein, forward clutch) and the transmission hydraulic line. At 508, the accumulator may be recharged. That is, an accumulator pressure may be restored by providing pressurized transmission fluid from the hydraulic line. At 510, the forward clutch inlet pressure of the forward clutch may be modulated to adjust an actuation of the clutch.

Figure 6:
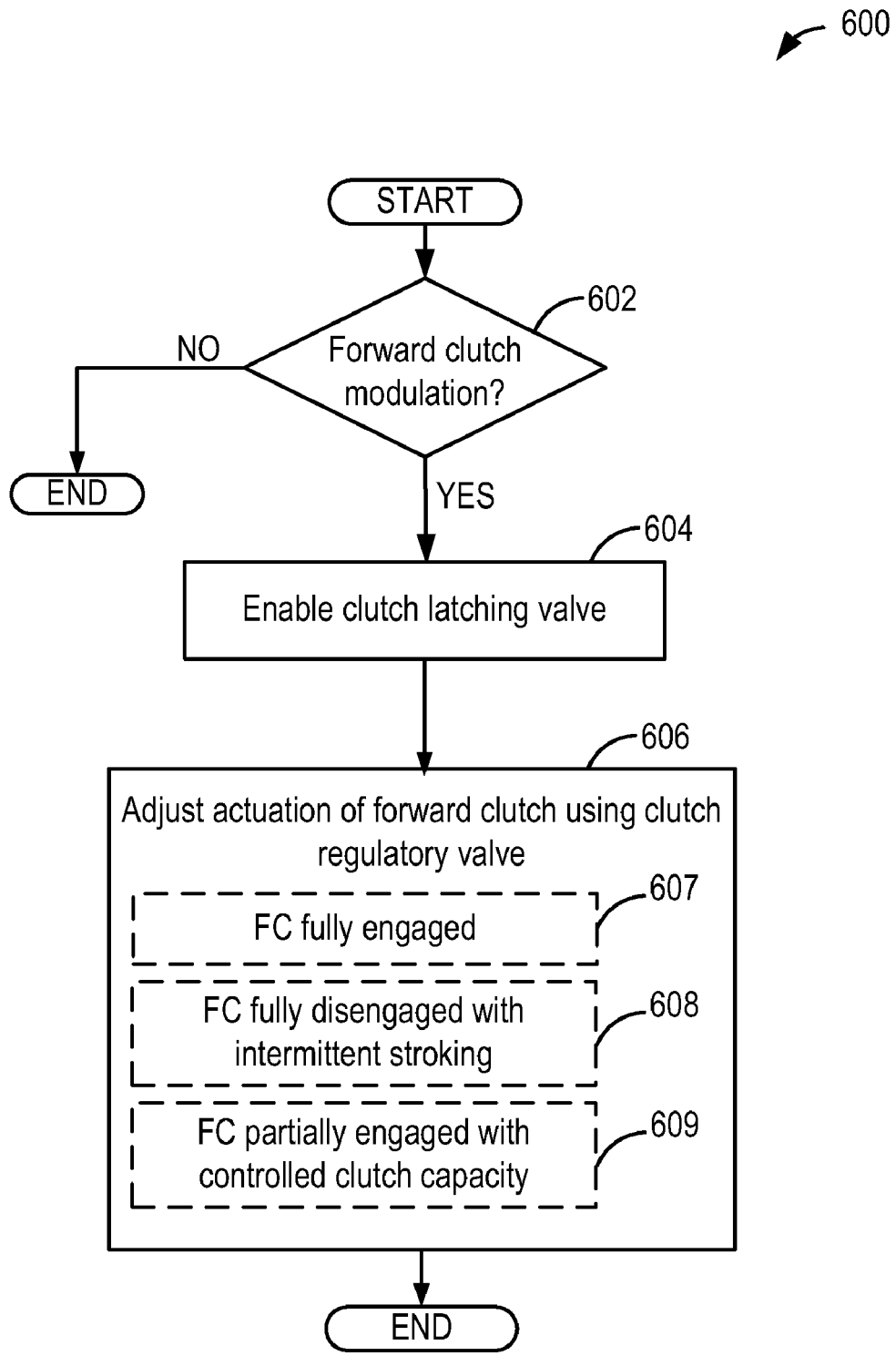
FIG. 6 shows a high level flow chart for modulating the transmission forward clutch of FIG. 1.

FIG. 6 depicts an example routine 600 that may be used during an engine idle-stop and/or an engine restart to adjust an actuation of a hydraulically actuated transmission component, such as a transmission forward clutch.

At 602, it may be confirmed that forward clutch modulation has been requested. If no forward clutch modulation is requested, the routine may end. If modulation is requested, then at 604, an engine controller may enable a corresponding clutch latching valve. At 606, a clutch regulatory valve may be adjusted to adjust an amount of pressurized hydraulic fluid directed into a forward clutch hydraulic circuit. By adjusting the amount of hydraulic fluid directed towards the forward clutch, the clutch inlet pressure may be adjusted to adjust an actuation of the forward clutch.

In one example, adjusting the actuation of the forward clutch may include, at 607, maintaining the forward clutch fully engaged. In another example, the adjustment may include, at 608, maintaining the forward clutch fully disengaged with intermittent stroking. In yet another example, the adjustment may include, at 609, maintaining the forward clutch partially engaged while controlling the clutch's capacity.

By adjusting an actuation of the transmission component over at least a duration of an engine idle-stop operation, the transmission component may be kept in an engagement ready state before an engine restart signal is received. By keeping the clutch in an engagement ready state, the clutch may be rapidly engaged and modulated during the subsequent engine restart, and torque may be rapidly transferred to the wheels to launch the vehicle.

Figure 7:
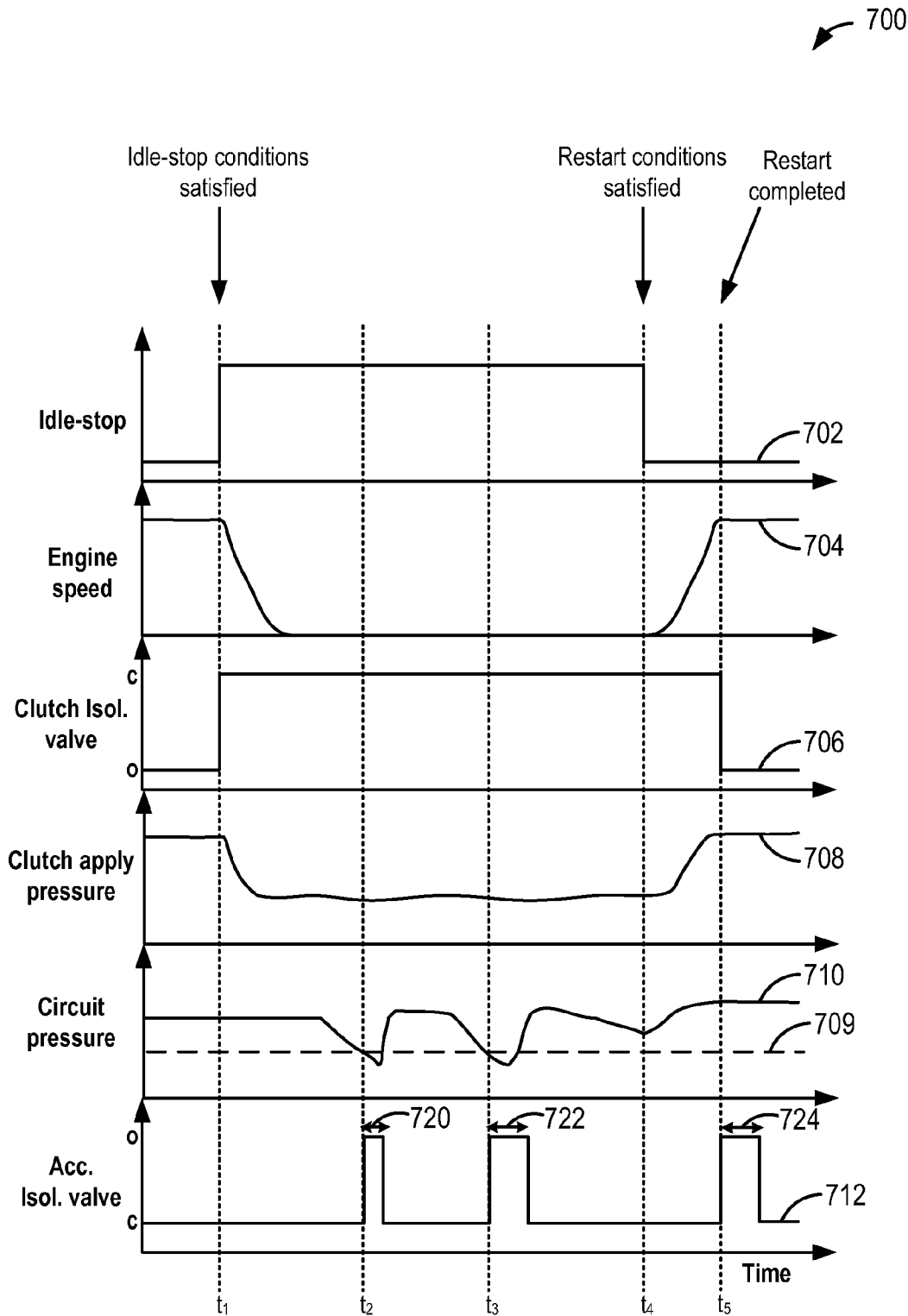
FIG. 7 shows a map with a plurality of graphs illustrating an example engine idle-stop and restart procedure with transmission component isolation, according to the present disclosure.

FIG. 7 depicts map 700 with a plurality of graphs for further explaining the engine shutdown and restart operations of the present disclosure. Map 700 includes an indication of engine idle-stop status at graph 702. Graph 704 depicts the engine speed profile responsive to the idle-stop and restart operations. Graph 706 represents the status of a clutch isolation valve while graph 712 represents the status of an accumulator isolation valve. Graph 708 depicts changes in a clutch apply pressure while graph 710 depicts changes in a clutch hydraulic circuit pressure during the idle-stop and restart operations.

At $t_1$, and as shown by graph 702, an idle-stop request may be confirmed (for example, by confirming idle-stop conditions) and an idle-stop operation may be initiated. Accordingly, engine speed (as depicted by graph 704) may start to drop as the engine spins down. In response to the idle-stop, and in anticipation of a drop in transmission hydraulic line pressure, a transmission component, such as a forward clutch, may be isolated from the transmission pump and transmission hydraulic line by closing a corresponding clutch isolation valve (as depicted by graph 706). As such, during the engine idle-stop, an actuation of the hydraulically actuated transmission component (herein, forward clutch) may be adjusted over a duration. In one example, the duration may include the entire idle-stop duration. In another example, the duration may include the entire idle-stop duration and until a subsequent engine restart is completed. In yet another example, the duration may include a duration immediately following the indication of engine idle-stop and/or a duration immediately following the indication of engine restart.

The adjustment of the actuation of the transmission component may be enabled by modulating a clutch apply pressure from a first apply pressure at an early part of the duration, to a second, lower, clutch apply pressure at a mid part of the duration, and then to a third, higher, clutch apply pressure at a later part of the duration, near an end of the duration. In the example, as depicted by the clutch apply pressure in graph 708, the forward clutch may be maintained partially engaged during the engine idle-stop. In order to maintain the desired actuation of the forward clutch and clutch apply pressure, a hydraulic pressure may be maintained in the corresponding clutch hydraulic circuit. Thus, by closing the clutch isolation valve and isolating the forward clutch at $t_1$, hydraulic pressure may be retained in the isolated clutch hydraulic circuit while hydraulic pressure is lost in the transmission hydraulic line and transmission pump.

During the duration when the forward clutch is isolated and an actuation of the forward clutch is being modulated, the clutch hydraulic circuit pressure may be maintained with the help of an accumulator coupled to the transmission component. The accumulator may be coupled to the transmission component responsive to the clutch hydraulic circuit pressure to compensate for pressure drops, for example, due to leakage of fluid through clutch seals and solenoids in the isolated clutch hydraulic circuit.

For example, at $t_2$, the clutch hydraulic circuit pressure may fall below a predetermined threshold 709. In response to the drop in pressure, at $t_2$, an accumulator isolation valve may be opened for a first duration 720 to restore the pressure, following which the accumulator isolation valve may be closed. In another example, at $t_3$, the clutch hydraulic circuit pressure may again fall below the predetermined threshold 709. In response to the drop in pressure, at $t_3$, the accumulator isolation valve may be opened for a second duration 722, longer than the first duration 720, to restore the pressure, following which the accumulator isolation valve may be closed. In this way, the accumulator isolation valve may only be opened for short durations to temporarily couple the accumulator to the transmission component of the isolated clutch hydraulic circuit, and restore circuit pressure. By restoring circuit pressure, the adjustment of the clutch actuation may be continued. By keeping the accumulator isolation valve closed and the accumulator isolated for the rest of the duration of the engine idle-stop, hydraulic stiffness may be maintained in the isolated clutch hydraulic circuit.

At $t_4$, an engine restart request (as shown in graph 702) may be confirmed (for example, by confirming restart conditions) and a restart operation may be initiated. Accordingly, engine speed (as depicted by graph 704) may start to increase as the engine spins up. As the engine spins up, the flow capacity of the engine-driven transmission pump may also be restored. As such, the engine restart may be completed at $t_5$. In response to the engine restart being completed, and in anticipation of a return in transmission hydraulic line pressure, the forward clutch may be coupled to the transmission pump and transmission hydraulic line by opening the clutch isolation valve (as depicted by graph 706). In alternate embodiments, the clutch isolation valve may be opened in concert with the engine restart signal (for example, at $t_4$). Additionally, the accumulator isolation valve may be opened, for example for a duration 724, in response to the completion of engine restart to couple the accumulator to the transmission pump and to enable the accumulator to be recharged.

In this way, during an engine idle-stop, the actuation of a hydraulically actuated transmission component may be adjusted over a duration. By modulating the clutch during the engine idle-stop, clutch engagement at restart may be expedited. To enable the actuation adjustment, a hydraulic circuit comprising the transmission component and an accumulator may be isolated from the transmission pump. By isolating the transmission component, hydraulic pressure may be retained in the hydraulic circuit while hydraulic pressure is lost in the transmission pump. Further, during the duration of clutch actuation, the accumulator may be isolated from the hydraulically actuated transmission component, when a pressure in the hydraulic circuit is above a threshold, to enable hydraulic stiffness to be maintained and enable rapid clutch response times. The accumulator may be coupled into the hydraulic circuit when the pressure is below the threshold, to thereby restore hydraulic pressure in the circuit and enable clutch modulation. Thus, clutch modulation may be performed during an engine idle-stop without operating an auxiliary pump while retaining restart performance and rapid clutch response times.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of pressurizing a hydraulic circuit comprising a hydraulically actuated transmission component and an accumulator, comprising, during an engine idle-stop,
adjusting actuation of the hydraulically actuated transmission component over a duration;
during the duration, isolating the accumulator from the hydraulically actuated transmission component when a pressure in the hydraulic circuit is above a threshold; and
during the duration, coupling the accumulator into the hydraulic circuit when the pressure is below the threshold.

2. The method of claim 1, wherein during the engine idle-stop includes until a subsequent engine restart is completed.

3. The method of claim 2, further comprising, following the engine restart, coupling the accumulator into the hydraulic circuit and recharging the accumulator.

4. The method of claim 2, wherein adjusting actuation of the hydraulically actuated transmission component includes closing a clutch isolation valve and engaging the transmission component.

5. The method of claim 4, wherein the accumulator is coupled to the transmission component via an accumulator isolation valve, and wherein isolating the accumulator includes closing the accumulator isolation valve, and coupling the accumulator includes opening the accumulator isolation valve.

6. The method of claim 1, wherein the hydraulic circuit includes a pressure sensor configured to estimate a pressure of the hydraulic circuit, and wherein the duration includes until a subsequent engine restart is completed and a starter motor is disengaged from the engine.

7. A method of pressurizing a clutch hydraulic circuit comprising a hydraulically actuated transmission component, and an accumulator, the clutch hydraulic circuit coupled to a transmission mechanical pump, the method comprising,
during an engine idle-stop,
isolating the clutch hydraulic circuit from the pump;
maintaining the transmission component in gear by maintaining a transmission clutch applied;
isolating the accumulator from the transmission component when a pressure in the clutch hydraulic circuit is above a threshold; and
coupling the accumulator to the transmission component when the pressure is below the threshold.

8. The method of claim 7, wherein isolating the clutch hydraulic circuit from the pump includes closing a clutch isolation valve.

9. The method of claim 8, wherein isolating the accumulator includes closing an accumulator isolation valve, and coupling the accumulator includes opening the accumulator isolation valve.

10. The method of claim 9, further comprising,
during an engine restart from the idle-stop,
coupling the clutch hydraulic circuit to the pump;
coupling the accumulator to the transmission component; and
recharging the accumulator.

11. The method of claim 10, wherein the clutch isolation valve and the accumulator isolation valve are one of a check valve, a ball valve, and a solenoid valve.

12. A vehicle system, comprising:
an engine that is selectively deactivated during idle-stop conditions;
an automatic transmission comprising a hydraulically actuated transmission component and a mechanical transmission pump;
an accumulator;
a clutch hydraulic circuit including the transmission component and the accumulator;
a pressure sensor configured to estimate a pressure in the clutch hydraulic circuit;
a control system configured to:
during an engine idle-stop,
isolate the clutch hydraulic circuit from the transmission pump;
adjust an actuation of the transmission component over a duration; and
during the duration,
couple the accumulator to the transmission component when a pressure in the isolated clutch hydraulic circuit is below a threshold; and isolate the accumulator from the transmission component when the pressure is above the threshold.

13. The system of claim 12, wherein the clutch hydraulic circuit is coupled to the transmission pump via a first isolation valve, and isolating the clutch hydraulic circuit from the pump includes closing the first isolation valve.

14. The system of claim 13, wherein the accumulator is coupled to the transmission component via a second isolation valve, and isolating the accumulator includes closing the second isolation valve.

15. The system of claim 14, wherein the control system is further configured to, during an engine restart from idle-stop, couple the clutch hydraulic circuit to the transmission pump by opening the first isolation valve; and
recharge the accumulator by opening the second isolation valve.

16. The system of claim 15 wherein the transmission is a multiple fixed ratio transmission.

17. The system of claim 16 wherein the transmission component is a transmission forward clutch.

* * * * *